(12) United States Patent
Tanimura et al.

(10) Patent No.: US 11,228,367 B2
(45) Date of Patent: Jan. 18, 2022

(54) COMMUNICATION DEVICE AND COMMUNICATION METHOD

(71) Applicant: FUJITSU LIMITED, Kawasaki (JP)

(72) Inventors: Takahito Tanimura, Yokohama (JP); Takeshi Hoshida, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 44 days.

(21) Appl. No.: 16/679,775

(22) Filed: Nov. 11, 2019

(65) Prior Publication Data
US 2020/0153504 A1 May 14, 2020

(51) Int. Cl.
*H04B 10/079* (2013.01)
*H04Q 11/00* (2006.01)

(52) U.S. Cl.
CPC ..... *H04B 10/0795* (2013.01); *H04Q 11/0062* (2013.01); *H04Q 2011/0079* (2013.01)

(58) Field of Classification Search
CPC .... H04B 10/0795; H04B 10/61; H04B 10/07; H04Q 11/0062; H04Q 2011/0079; H04Q 2011/0081; H04Q 2011/0083; H04L 310/07
USPC ........................................... 398/9–38
See application file for complete search history.

(56) References Cited

U.S. PATENT DOCUMENTS

| | | | | |
|---|---|---|---|---|
| 6,229,631 B1* | 5/2001 | Sato | ........... | H04B 10/0779 398/30 |
| 8,111,986 B1* | 2/2012 | Lindsay | ........... | H04B 10/0731 398/16 |
| 8,254,781 B2* | 8/2012 | Lindsay | ........... | H04B 17/345 398/25 |
| 10,236,982 B1* | 3/2019 | Zhuge | ........... | H04B 10/2513 |
| 10,348,410 B1* | 7/2019 | Charlton | ........... | H04B 10/40 |
| 10,419,109 B1* | 9/2019 | Oveis Gharan | ...... | H04B 10/614 |
| 2004/0208514 A1* | 10/2004 | Zhang | ........... | H04B 10/0795 398/25 |

(Continued)

FOREIGN PATENT DOCUMENTS

| | | |
|---|---|---|
| JP | 11-8590 A | 1/1999 |
| JP | 2011-103545 A | 5/2011 |
| JP | 2013-207482 A | 10/2013 |
| WO | WO-2019170873 A1 * | 9/2019 ....... H04B 10/07953 |

OTHER PUBLICATIONS

Boitier et al; Proactive Fiber damage detection in real time coherent receiver; IEEE; 2017; pp. 1-3. (Year: 2017).*

(Continued)

*Primary Examiner* — Amritbir K Sandhu
(74) *Attorney, Agent, or Firm* — Fujitsu Patent Center

(57) ABSTRACT

A communication device used in an optical communication system, the communication device includes a mode change over device configured to switch between a learning mode for learning a normal state of an optical transmission path before operation and a monitoring mode for monitoring a state of the optical transmission path during operation, an anomaly detector configured to detect an anomaly of the optical transmission path using a prediction model determined by the learning mode when the monitoring mode is selected, and a data writer configured to extract waveform data including information related to the anomaly to output the extracted waveform data to an outside when the anomaly is detected.

20 Claims, 12 Drawing Sheets

(56) References Cited

U.S. PATENT DOCUMENTS

| | | | |
|---|---|---|---|
| 2009/0060499 A1* | 3/2009 | Chung | H04B 10/0795 398/34 |
| 2010/0092168 A1* | 4/2010 | Li | H04B 10/0795 398/16 |
| 2010/0178059 A1* | 7/2010 | Shou | H04B 10/695 398/136 |
| 2011/0249971 A1* | 10/2011 | Oda | H04B 10/2572 398/65 |
| 2012/0263457 A1* | 10/2012 | Mahlab | H04B 10/0795 398/25 |
| 2017/0155446 A1* | 6/2017 | Watanabe | H04J 14/0271 |
| 2018/0248905 A1* | 8/2018 | Cote | G06F 17/18 |
| 2018/0262291 A1* | 9/2018 | Doster | H04B 13/02 |
| 2019/0245620 A1* | 8/2019 | Rafique | H04B 10/07 |
| 2019/0303726 A1* | 10/2019 | Cote | G06N 20/00 |
| 2020/0106523 A1* | 4/2020 | Zhang | H04B 10/0775 |
| 2020/0153504 A1* | 5/2020 | Tanimura | H04B 10/61 |

OTHER PUBLICATIONS

Boitier et al; Automated Optical networks with Monitoring and Machine learning; IEEE; 2018; pp. 1-4. (Year: 2018).*

Microsoft et al; Time series Anomaly Detection; May 2019; Microsoft documents; pp. 1-11. (Year: 2019).*

Boitier et al ; Proactive fiber damage detection in real time coherent receiver; 2017; IEEE; pp. 1-3. (Year: 2017).*

Ren et al; Time series anomaly detection service at Microsoft; The 25th ACM SIGKDD Conference on Knowledge Discovery and Data Mining; 2019; pp. 1-9. (Year: 2019).*

Hauske, Fabian et al., "Optical Performance Monitoring in Digital Coherent Receivers," IEEE Journal of Lightwave Technology, vol. 27, No. 16, pp. 3623-3631, Aug. 15, 2009.

* cited by examiner

COMMUNICATION DEVICE AND COMMUNICATION METHOD

CROSS-REFERENCE TO RELATED APPLICATION

This application is based upon and claims the benefit of priority of the prior Japanese Patent Application No. 2018-214107, filed on Nov. 14, 2018, the entire contents of which are incorporated herein by reference.

FIELD

The embodiments discussed herein are related to a communication device and a communication method.

BACKGROUND

The demand for large-capacity and high-speed optical communication systems is increasing due to the spread of information communication terminals represented by smartphones and the advancement of the Internet of Things (IoT) technology. In order to implement high-speed and large-capacity communication, optical networks exceeding 100 Gbps using a coherent method are spreading. In the coherent method, a received optical signal is detected by local oscillation light, and a waveform distortion generated in the transmission path is compensated by digital signal processing after being converted into an electrical signal. The individual chromatic dispersion compensators, which have been required in the related art, and the optical amplifier for compensating for the insertion loss may be omitted, so that the system may be reduced in size and cost.

On the other hand, optical communication network systems are becoming more complex, and it is required to open the specifications and coupling methods and operate and manage them stably at reasonable costs. It is desired provide a system that automatically monitors the state of a transmission path or network to detect the sign of an anomaly early and solve the problem.

A configuration for continuously monitoring the parameters of the optical transmission path with a digital coherent receiver has been offered.

Related technologies are disclosed in, for example, Japanese Laid-open Patent Publication No. 11-008590 and F. N. Hauske, et al., "Optical Performance Monitoring in Digital Coherent Receivers", IEEE Journal of Lightwave Technology, vol. 27, no. 16, pp. 3623-3631. Aug. 15, 2009.

SUMMARY

According to an aspect of the embodiments, a communication device used in an optical communication system, the communication device includes a mode change over device configured to switch between a learning mode for learning a normal state of an optical transmission path before operation and a monitoring mode for monitoring a state of the optical transmission path during operation, an anomaly detector configured to detect an anomaly of the optical transmission path using a prediction model determined by the learning mode when the monitoring mode is selected, and a data writer configured to extract waveform data including information related to the anomaly to output the extracted waveform data to an outside when the anomaly is detected.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

In the known monitoring method with a digital coherent receiver, a fixed index set in the digital signal processor (DSP) is used, so that monitoring flexibility is lacking and it is difficult to perform the detailed analysis beyond the design range.

In view of the above, it is desirable to provide a communication device and a communication method that realize flexible monitoring of a transmission path.

One way to flexibly monitor the state of the transmission path is that the receiving side outputs (stream) all waveform data after digital conversion to an external storage and analyzes it at the software layer. The problem with the transmission path may be analyzed in detail by storing the waveform data actually obtained from the transmission path. However, since all waveform data is output by streaming, a large amount of data unnecessary for problem detection is included, and resources are wasted.

In the embodiment, the optical receiving side extracts transmission data at the time when a transmission path anomaly or its sign is detected and outputs the extracted transmission data to an external storage, so that it is possible to save resources and perform detailed analysis after the fact To do.

In order to suppress an excessive alert in which a false-positive alert is generated due to the transmission path fluctuation even when there are no operational problems, the communication device learns rational anomaly determination criteria in advance to increase the accuracy of anomaly determination. As an example, the communication device performs machine learning as a "normal state" of a network including a drift or a change within an allowable range that does not cause an operational problem.

Figure 1A:
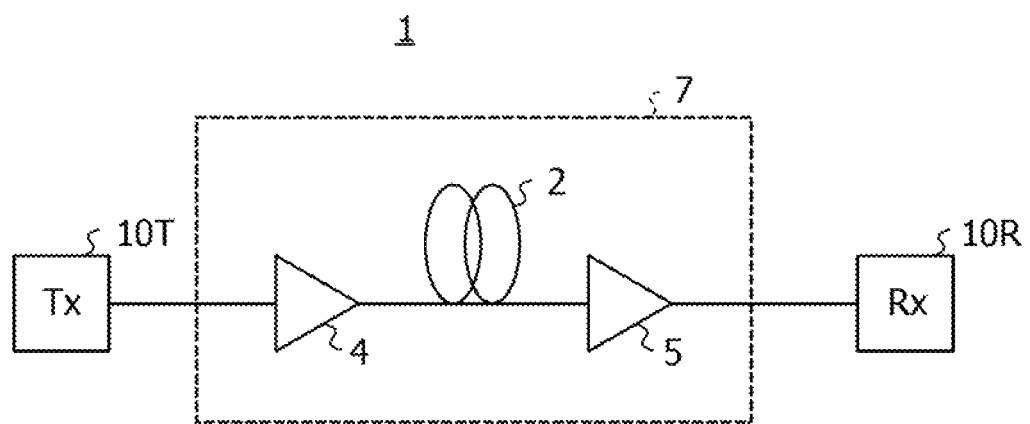
FIG. 1A is a schematic diagram of an optical communication system to which a communication device of an embodiment is applied.

FIG. 1A is a schematic diagram of an optical communication system 1 to which the configuration and method of the embodiment are applied. In the optical communication system 1, an optical transmitter (denoted as "Tx") 10T and an optical receiver (denoted as "Rx") 10R are coupled by an optical transmission path 7. Both the optical transmitter 10T and the optical receiver 10R are an example of the communication device.

The optical transmission path 7 includes an optical fiber cable 2 and relays (or optical amplifiers) 4 and 5. In a transmission path using an optical fiber, an optical signal undergoes a physical change such as chromatic dispersion, polarization dispersion, or polarization dependent loss (PDL) through the optical fiber. The physical change that occurs in the optical transmission path 7 causes waveform deterioration. The waveform also deteriorates due to deterioration of the characteristics of the devices such as the relays 4 and 5 inserted in the optical transmission path 7. Therefore, it is required to monitor the state of the optical transmission path 7 and maintain the transmission quality.

Figure 1B:
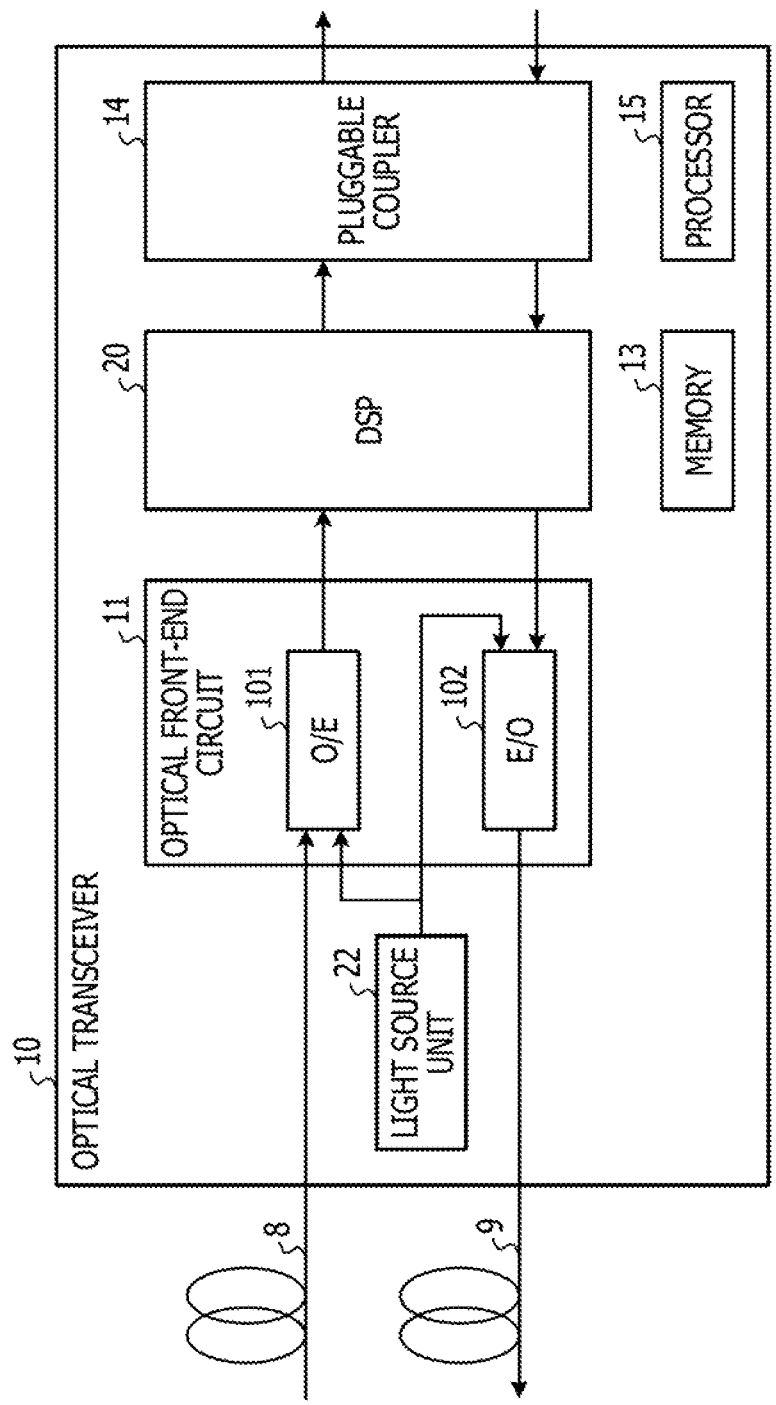
FIG. 1B is a schematic diagram of an optical transceiver to which the communication device of the embodiment is applied.

FIG. 1B illustrates a schematic configuration of an optical transceiver 10 as another example to which the communication device of the embodiment is applied. Since optical communication is performed in both directions, the communication device generally has functions of a transmitter and a receiver. The optical transceiver 10 is, for example, a pluggable optical transceiver module, and an optical front-end circuit 11, a light source unit 22, and a DSP 20 are accommodated in a package. The optical transceiver 10 may be detachably coupled to, for example, a transmission device on the client side by a pluggable coupler 14.

The optical signal received from the optical transmission path 8 is input to a photoelectric (O/E) converter 101 of the optical front-end circuit 11. The optical signal is converted into an electrical signal and output to the DSP 20. An electro-optical (E/O) conversion unit 102 converts the data signal input from the DSP 20 into an optical signal, and outputs the optical signal to an optical transmission path 9.

The DSP 20 performs, on the reception signal, digital processing such as error correction decoding including chromatic dispersion compensation, adaptive equalization, frequency offset compensation, carrier phase compensation, and the like, and outputs the decoded signal. On the transmission side of the DSP 20, error correction coding, mapping to electric field information (phase/amplitude) according to the logical value of the data, waveform processing, and the like are performed on the data signal to be transmitted and the processed data signal is output to the E/O converter 102. The data signal is converted into an optical signal by the E/O converter and output to the optical transmission path 9.

The optical transceiver 10 also includes a memory 13 and a processor 15. The processor 15 may be part of the DSP 20 or may be a separate logic device such as a field-programmable gate array (FPGA). In the embodiment, as will be described later, the processor 15 is caused to function as a network anomaly monitoring/detecting device.

Figure 2:
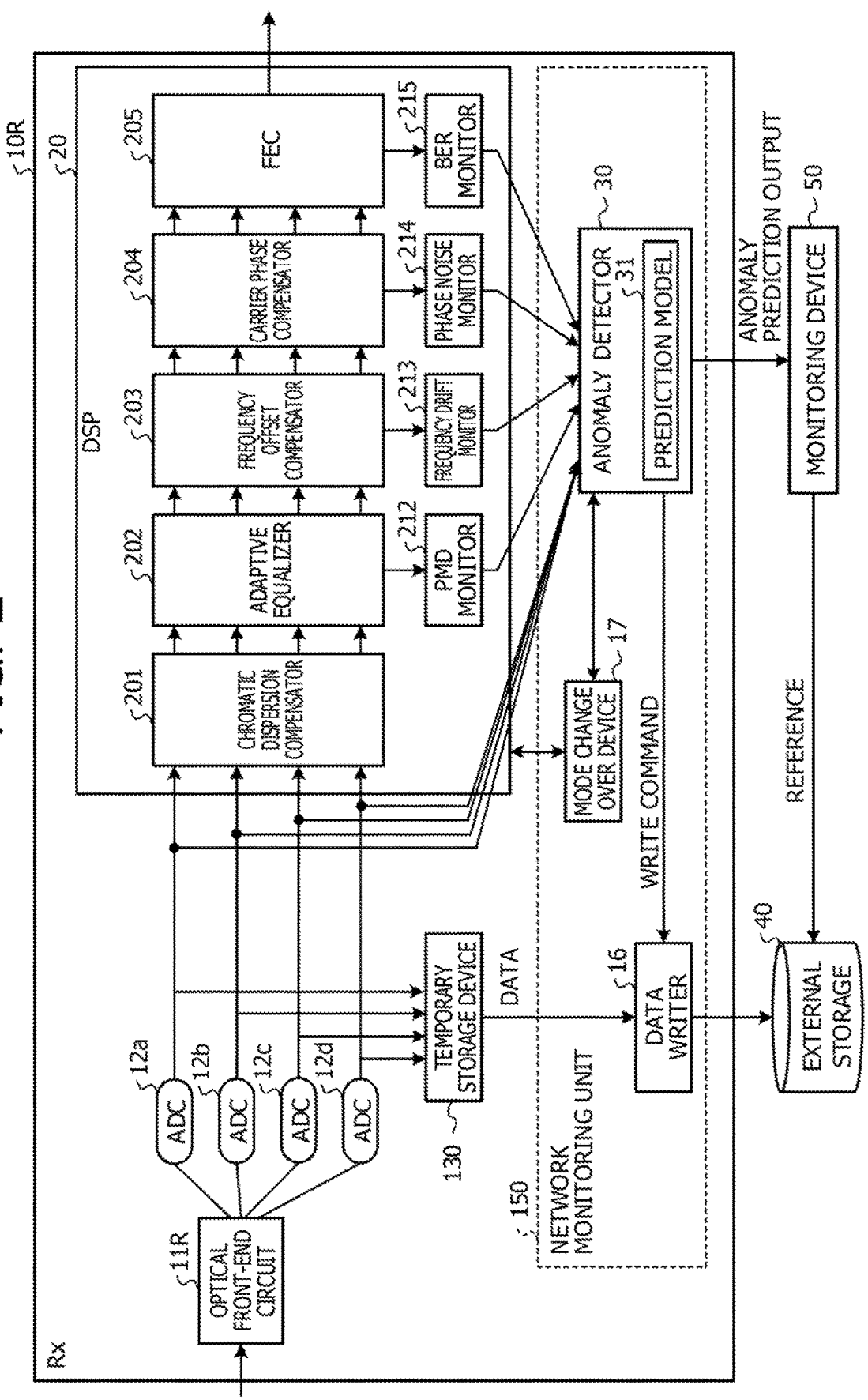
FIG. 2 illustrates a configuration example of an optical receiver according to the embodiment.

FIG. 2 is a configuration example of the optical receiver 10R according to the embodiment. The optical receiver 10R includes an optical front-end circuit 11R, analog/digital converters (ADCs) 12a to 12d, the DSP 20, a temporary storage device 130, and a network monitoring unit 150. The temporary storage device 130 may be part of the memory 13. The functions of the network monitoring unit 150 are implemented by the processor 15.

The optical receiver 10R receives an optical signal modulated by, for example, a dual polarization-quadrature phase shift keying (DP-QPSK) method. The optical front-end circuit 11R separates the input optical signal into the X-polarized wave and the Y-polarized wave that are orthogonal to each other, and uses local oscillation light from the light source unit 22 (see FIG. 1B) to detects the in-phase (I) component and the 90° phase (Q) component for polarized wave with a 90° hybrid optical mixer. Respective phase components (XI, XQ, YI, YQ) of each polarized wave are detected by corresponding light receiving elements, converted into a voltage signal, and four analog electrical signals are output.

The ADCs 12a to 12d digitally sample the analog electrical signal and supply the digital waveform to the DSP 20 and the network monitoring unit 150. This digital waveform is held in the temporary storage device 130 for a certain time during operation. The digital waveform may be recorded in the temporary storage device 130 during learning before operation, but the input digital waveform is overwritten sequentially during learning.

The DSP 20 includes a chromatic dispersion compensator 201, an adaptive equalizer 202, a frequency offset compensator 203, a carrier phase compensator 204, and a forward error correction (FEC) unit 205. The chromatic dispersion compensator 201 compensates for a signal waveform distortion due to chromatic dispersion.

The adaptive equalizer 202 compensates for a signal waveform distortion due to polarization mode dispersion. The adaptive equalizer 202 is coupled to a polarization mode dispersion (PMD) monitor 212, and the PMD monitor 212 monitors the group delay difference between two orthogonal polarization modes.

The frequency offset compensator 203 compensates for a frequency drift between the transmission signal and the reception signal. The frequency offset compensator 203 is coupled to a frequency drift monitor 213, and the frequency drift monitor 213 monitors the amount of frequency drift between the transmission signal and the reception signal.

The carrier phase compensator 204 compensates for phase noise on the digital sampling data. The carrier phase compensator 204 is coupled to a phase noise monitor 214, and the phase noise monitor 214 monitors the phase noise.

The FEC unit 205 performs forward error correction processing. The FEC unit 205 is coupled to a bit error rate (BER) monitor 215, and the BER monitor 215 monitors the BER.

Monitor values obtained by the PMD monitor 212, the frequency drift monitor 213, the phase noise monitor 214, and the BER monitor 215 are supplied to the network monitoring unit 150.

The network monitoring unit 150 includes a data writer 16, a mode change over device 17, and an anomaly detector 30. The anomaly detector 30 includes a prediction model 31.

The mode change over device 17 switches the operation of the optical receiver 10R between the learning mode and the monitoring mode. The learning mode is selected when an optical receiver 10Rx is newly installed or is reactivated after maintenance. The monitoring mode is selected during actual operation after learning is completed.

In the learning mode, the anomaly detector 30 performs machine learning on the normal state of the network including a drift within an allowable range that does not cause an operational problem, and sets appropriate parameters in the prediction model 31.

A machine learning model may be used as the prediction model 31. The machine learning model include, but are not limited to, a support vector machine, logistic regression, random forest regression, a neural network, a recurrent neural network (including a long short-term memory (LSTM) recurrent neural network), and the like.

The optical receiver 10R learns the normal state of the transmission path including a drift or a fluctuation in a range that does not hinder operation, so that the generation of a false positive alert when the transmission path state changes from the initial state, which is no operational problem, suppressed.

In the monitoring mode after learning, the prediction model 31 is used to predict and detect the network anomaly based on the prediction value predicted from the digital sampling data obtained from the ADCs 12a to 12d and the monitor value output from the DSP 20. "Anomaly detection" is a collective term for detecting a failure, a malfunction, and the like that occur in a transmission path or a device inserted in the transmission path, and a sign of the failure.

In the machine learning model, when there is an input of an environment similar to that at the time of learning (normal state), the model returns a prediction value with high accuracy, so that the anomaly score is low. When there is an input of an environment different from that at the time of learning (abnormal state), the prediction accuracy decreases and the anomaly score is high. By calculating the anomaly score continuously during operation and comparing the anomaly score with the threshold value set appropriately, it is possible to detect an anomaly or its sign in the transmission path.

When an anomaly or its sign is detected by the anomaly detector 30 during operation, the anomaly detector 30 outputs a data write command to the data writer 16 and outputs an anomaly prediction report or an alert to an external monitoring device 50. The data writer 16 writes the digital sampling data from the temporary storage device 130 according to the write command and outputs the written digital sampling data to an external storage 40. The data written from the temporary storage device 130 is data at the time when a transmission path anomaly is detected, and includes information on the transmission path anomaly.

When receiving the anomaly prediction output, the monitoring device 50 accesses the external storage 40 and analyzes the digital sampling data related to the anomaly prediction.

When no anomaly is detected by the anomaly detector 30, the write command and the anomaly prediction alert are not output, and the digital sampling data is captured into the temporary storage device 130 and the DSP 20 at the next timing. In the temporary storage device 130, the newly captured digital waveform is overwritten. The DSP monitors newly captured digital sampling data and outputs the monitor value to the network monitoring unit 150. The network monitoring unit 150 predicts or detects an anomaly in the transmission path based on the monitor value and the prediction value obtained from the digital waveform input based on the prediction model 31. A write command and an anomaly prediction alert are output according to the prediction result.

The network monitoring unit 150 monitors and detects a change in the state that occurs in the transmission path or network on the time axis, and outputs the digital waveform data when a change in the state that may cause an operational problem occurs. The temporary storage device 130 holds the monitor value output by the DSP 20 and the digital sampling data captured at each time t only during the period of the prediction process by the anomaly detector 30.

With this configuration, only data including anomaly information on the transmission path is extracted, and resources for network monitoring are saved. Detailed analysis after the event is possible from the data extracted by the optical receiver 10R and stored in the external storage 40. Furthermore, since the normal state of the transmission path including fluctuations in the range expected in operation is learned, the excessive alert is suppressed.

<Settings Before Learning>

Figure 3:
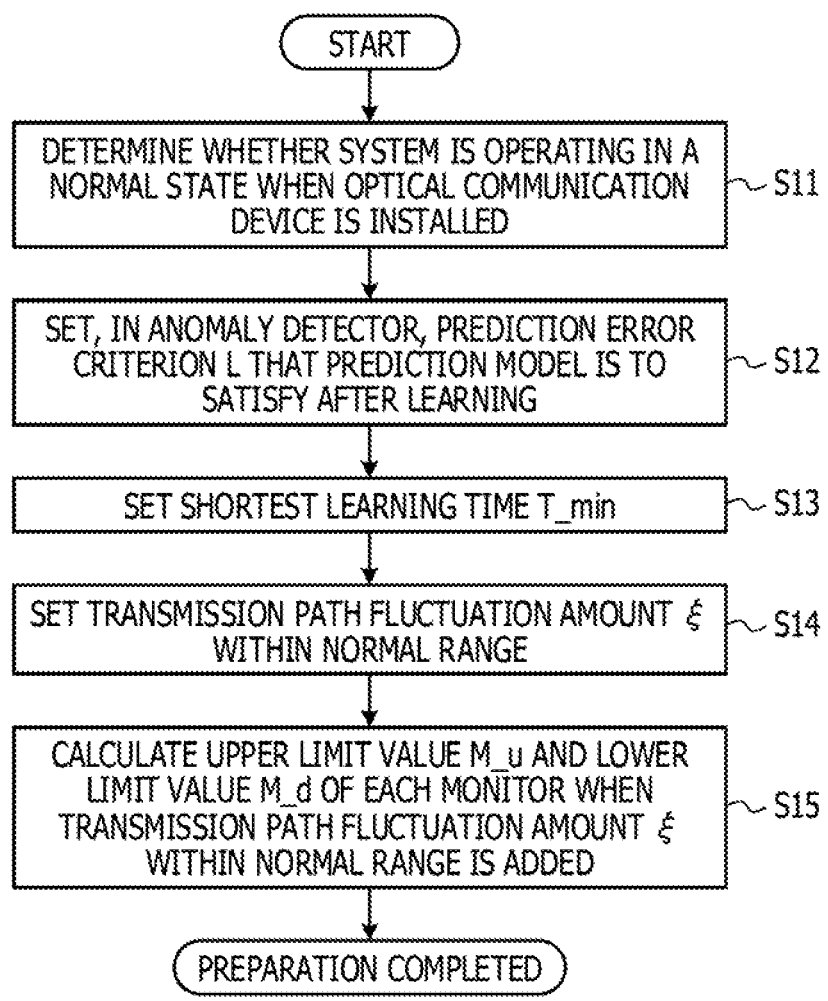
FIG. 3 is a flowchart when the optical receiver is installed and reactivated.

FIG. 3 is a flowchart when the optical receiver 10R is installed or reactivated. The optical receiver 10R performs a predetermined preparation operation before entering the learning mode. First, when the optical receiver 10R is coupled to the network (see FIG. 1A), it is determined whether the optical communication system 1 is functioning normally (S11). This validation may be performed by the installer or the maintenance manager using a separately prepared measurement device. For example, it is determined whether the test signal transmitted from the opposing optical transmitter 10T is received with an appropriate signal strength.

Next, a prediction error criterion "L" to be satisfied by the prediction model 31 after learning is set (S12). The prediction error criterion "L" is the maximum allowable prediction error in the transmission path in the normal state, and is used as a reference value when learning the normal status of the transmission path. The prediction error criterion "L" is set in the anomaly detector 30 of the network monitoring unit 150.

Next, the shortest learning time T_min is set (S13). The shortest learning time T_min is the shortest time required to set an appropriate parameter in the prediction model 31 by learning with the optical receiver 10R. As will be described later, the appropriate parameter is a parameter that is determined by reflecting fluctuations within a range expected in operation in the normal state of the transmission path.

The prediction model is set as an initial parameter before learning, and is updated to a parameter suitable for a specific transmission path by learning the state of the optical transmission path. The shortest learning time T_min may be set based on an experience value according to the prediction model used.

Next, in order to simulate a drift within an expected range of the transmission path to which the optical receiver 10R is coupled, a transmission path fluctuation amount $\xi$ is given to a test signal transmitted and received during learning within a range that does not hinder the operation (S14). The transmission path fluctuation amount $\xi$ may be given by at least one of the optical transmitter 10T and the optical receiver 10R. The fluctuation of the transmission path is a physical change that occurs in the optical transmission path 7 and includes a polarization rotation, a DGD, a PDL, a frequency drift, an optical signal to noise ratio (OSNR), a phase noise, and the like. The transmission path fluctuation amount $\xi$ is set for each of these physical changes.

Next, the upper limit value M_u and the lower limit value M_d of each monitor output of the optical receiver 10R when the transmission path fluctuation amount $\xi$ is added are calculated (S15). The monitors of the optical receiver 10R are the PMD monitor 212, the frequency drift monitor 213, the phase noise monitor 214, the BER monitor 215, and the like in the example of FIG. 2, but are not limited to these examples. For example, the residual chromatic dispersion amount may be output as a monitor value. By setting the upper limit value and the lower limit value of each monitor, the fluctuation amount of the normal range generated in the transmission path is converted into the allowable output range of each monitor value. As a result, preparation for starting the learning mode is completed.

<Learning Mode>

Figure 4:
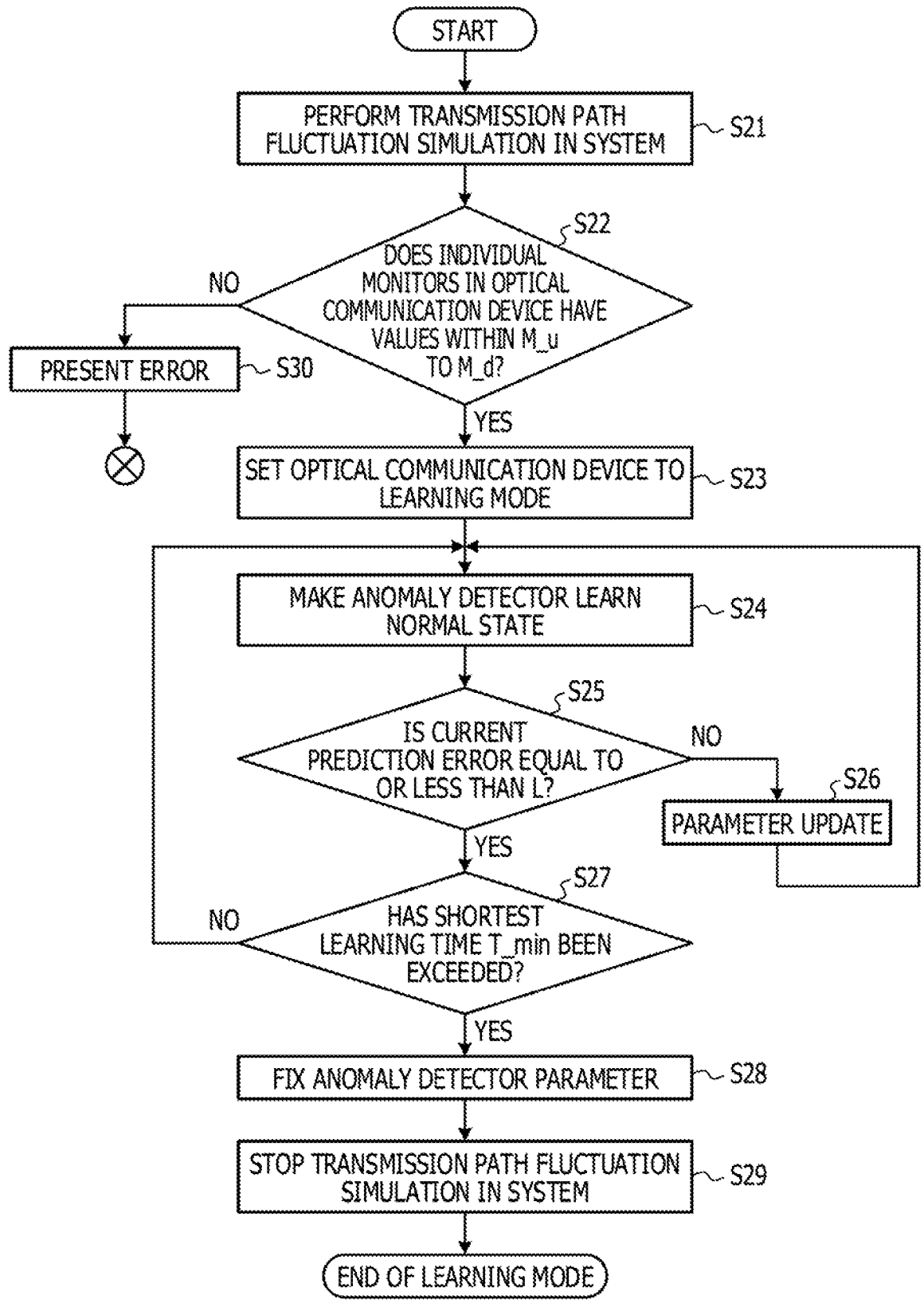
FIG. 4 is a flowchart of the learning mode of the optical receiver.

FIG. 4 is a flowchart of the learning mode of the optical receiver 10R. When the setting described with reference to FIG. 3 is completed, the transmission path fluctuation of the optical communication system 1 is simulated (S21). In the simulation of the transmission path fluctuation, for example, an optical signal is transmitted from the opposing optical transmitter 10T in a state where the transmission path fluctuation amount ξ is added to the actual optical transmission path 7, and is received by the optical receiver 10R.

The anomaly detector 30 of the optical receiver 10R determines whether the output values of the PMD monitor 212, the frequency drift monitor 213, the phase noise monitor 214, and the BER monitor 215 are between the upper limit value M_u and the lower limit value M_d (S22).

When one of the monitor outputs exceeds the set allowable output range ("NO" in S22), it means that some anomaly that exceeds normal transmission path fluctuation has occurred. In this case, an error is displayed (S30), and the process is temporarily terminated. Step S21 may be resumed after a certain time has elapsed, or whether the optical communication system 1 is operating normally may be redetermined using the measurement device.

When all the outputs of each monitor are between the upper limit value M_u and the lower limit value M_d ("YES" in S22), it means that the current transmission path is in a normal state including allowable fluctuations. In this case, the mode change over device 17 sets the mode of the optical receiver 10R to the learning mode (S23).

In the learning mode, the anomaly detector 30 learns the normal state of the transmission path (S24). The anomaly detector 30 acquires, as a prediction error, the absolute value of the difference between the output value (measured value) from each monitor and the prediction value based on the prediction model 31 at each time t, and determines whether the current prediction error is equal to or less than the prediction error reference value "L" set in the anomaly detector 30 (S25).

When the current prediction error is equal to or less than the prediction error reference value "L" ("YES" in S25), the parameters set in the prediction model 31 are maintained and it is determined whether the current time exceeds the shortest learning time T_min (S26). When the set shortest learning time T_min is not exceeded ("NO" in S26), the process returns to step S24 and the learning is continued.

When the current prediction error exceeds the reference value L ("NO" in S25), the learning is repeated while updating the parameter of the prediction model 31 so that the prediction error is smaller than the prediction error reference value "L" (S24 to S26). The fact that the error between the measured value and the prediction value obtained by the prediction model 31 is equal to or less than the prediction error reference value "L" means that the normal state of the transmission path including the transmission path fluctuation within a range that does not hinder the operation that do not hinder the operation is learned.

When the learning is continued until the set shortest learning time T_min is exceeded ("YES" in S27), the parameter of the prediction model are fixed to the parameter values at the time (S28). The parameters are, for example, a weight coefficient of each layer, a function of each layer, and the like, depending on the prediction model used.

When the learning is completed and the parameters of the prediction model are fixed, the simulation of the transmission path fluctuation is stopped (S29), and the learning mode ends.

Figure 5:
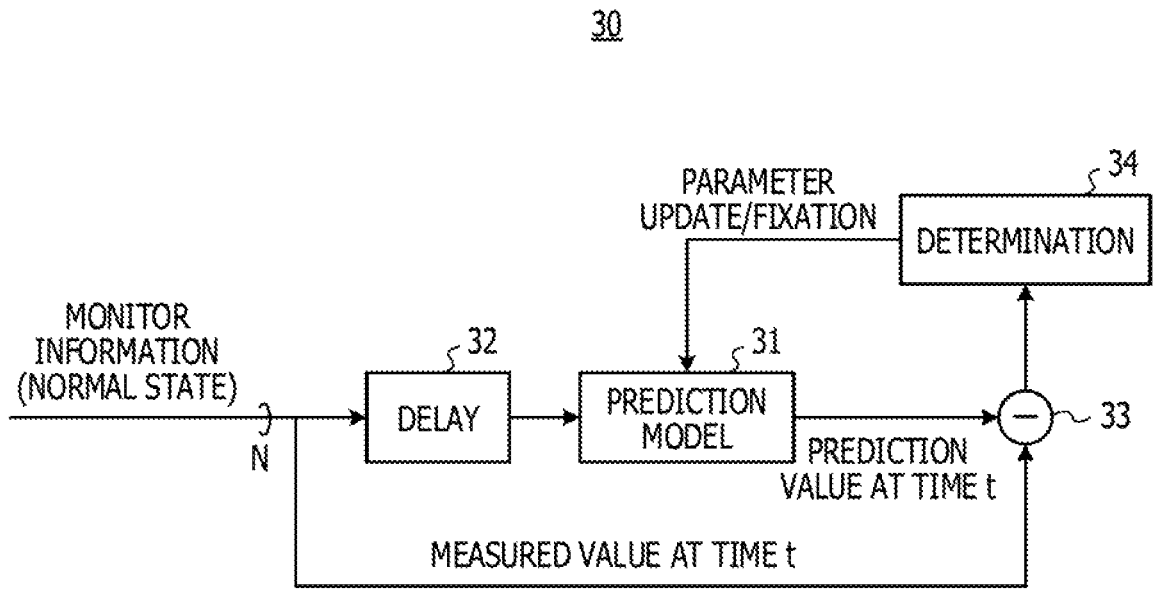
FIG. 5 illustrates a configuration example of an anomaly detector and an operation example during learning.

FIG. 5 illustrates a configuration example of the anomaly detector 30 and an operation during learning (at the time of deployment). The anomaly detector 30 includes the prediction model 31, a delay circuit 32, a subtractor 33, and a determiner 34. The output of the determiner 34 is coupled to the input of the prediction model 31.

Monitor information obtained from a normal transmission path is input to the anomaly detector 30. The monitor information includes the output value of each monitor (for example, the PMD monitor 212, the frequency drift monitor 213, the phase noise monitor 214, the BER monitor 215, and the like) obtained from the digital sampling data at time t. The number N of pieces of monitor information is determined according to the number or the type of monitors set in the DSP 20 of the optical receiver 10R, where N is an integer of 1 or more. The output value of each monitor is coupled to one input of the subtractor 33 as an measured value at time t.

Along with N pieces of monitor information, the digital sampling data is input to the anomaly detector 30 at time t. The digital sampling data is delayed by the delay circuit 32 by the signal processing time by the DSP 20 and input to the prediction model 31. The prediction model 31 calculates a prediction value from the input digital sampling data and outputs it. This prediction value is coupled to the other input of the subtractor 33 as a prediction value at time t.

The output of the subtractor 33 is the difference between the measured value and the prediction value of the optical transmission path at time t. This difference is input to the determiner 34. The determiner 34 determines whether the absolute value of the difference (that is, the prediction error) is equal to or less than the set prediction error criterion "L".

When the absolute value of the difference exceeds the prediction error criterion "L", the parameter value of the prediction model 31 is updated with a predetermined step size. By performing this learning for the shortest learning time T_min, the normal status of the transmission path is learned, and an optimal prediction model 31 for a specific transmission path is set.

<Monitoring Mode>

Figure 6:
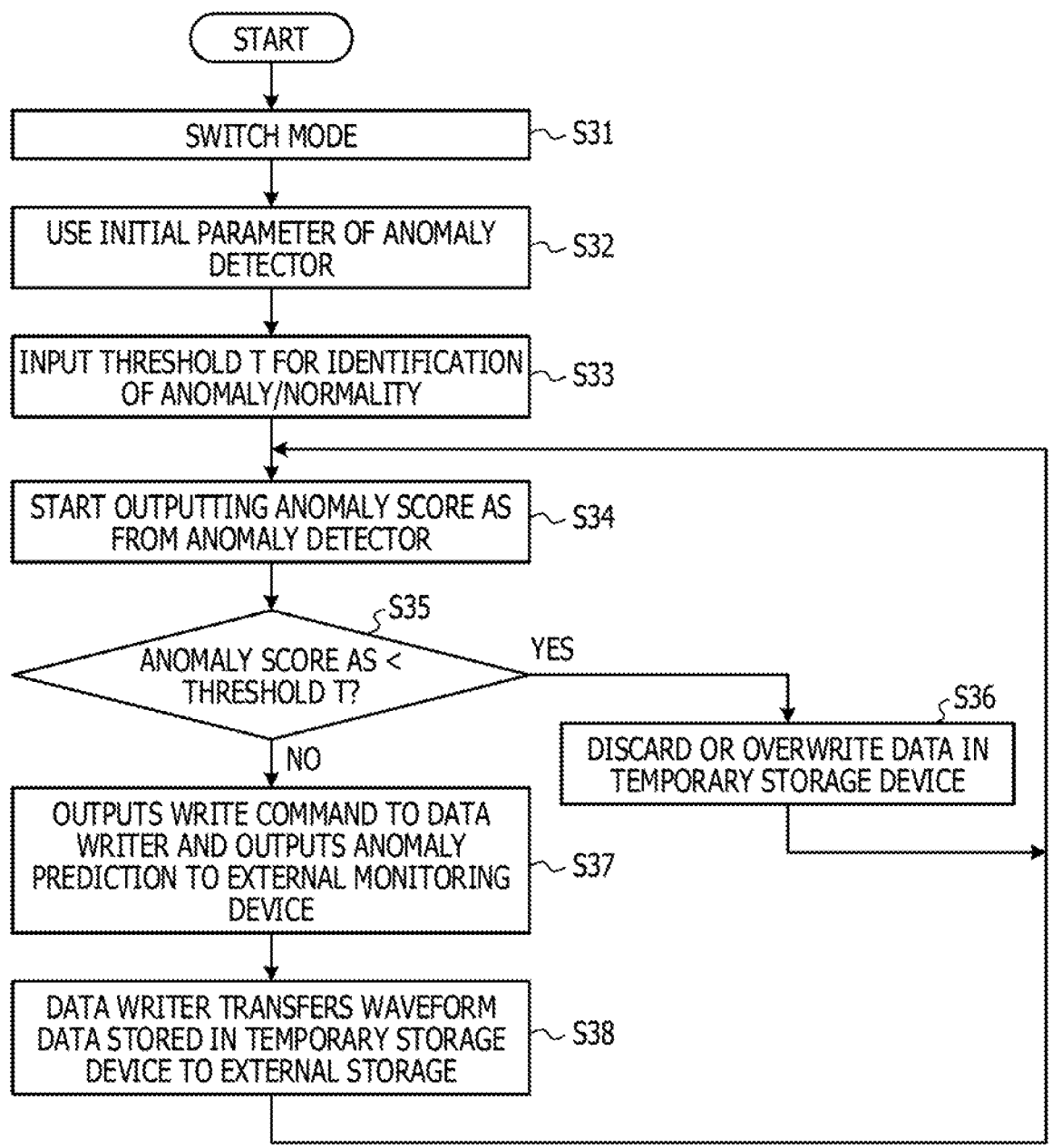
FIG. 6 is a flowchart when the optical receiver is operated.

FIG. 6 is a flowchart when the optical receiver 10R is operated. First, the mode of the optical receiver 10R is switched to the monitoring mode (S31). In the monitoring mode, the prediction model 31 having the parameter value set by learning is used (S32). A threshold T for identifying whether the transmission path is abnormal or normal during operation is input (S33). This threshold T may be determined from the history of the difference between the prediction value and the measured value obtained in the learning mode.

The anomaly detector 30 outputs an anomaly score (AS) each time digital sampling data and a monitor value from the DSP 20 are input. The anomaly score is a numerical value indicating the degree of deviation from the prediction model 31.

The anomaly detector 30 determines whether the anomaly score AS is smaller than the threshold T (S35). When the anomaly score AS is smaller than the threshold T ("YES" in S35), the data in the temporary storage device 130 is discarded or overwritten, and the digital sampling data and monitor value at next time (t+1) are acquired (S36). The anomaly score AS is calculated from the acquired digital sampling data and the monitor value (S34).

When the anomaly score AS is equal to or higher than the threshold T ("NO" in S35), the anomaly detector 30 outputs a write command to the data writer 16 and outputs an anomaly prediction to the external monitoring device 50 (S37). The data writer 16 writes the digital waveform data stored in the temporary storage device 130 in accordance with the write command and outputs it to the external storage 40 (S38). The data written here is a digital waveform at time (t+1) when an anomaly or its sign is detected, and includes anomaly information of the transmission path or network. The process of FIG. 6 is repeatedly performed during operation.

Figure 7:
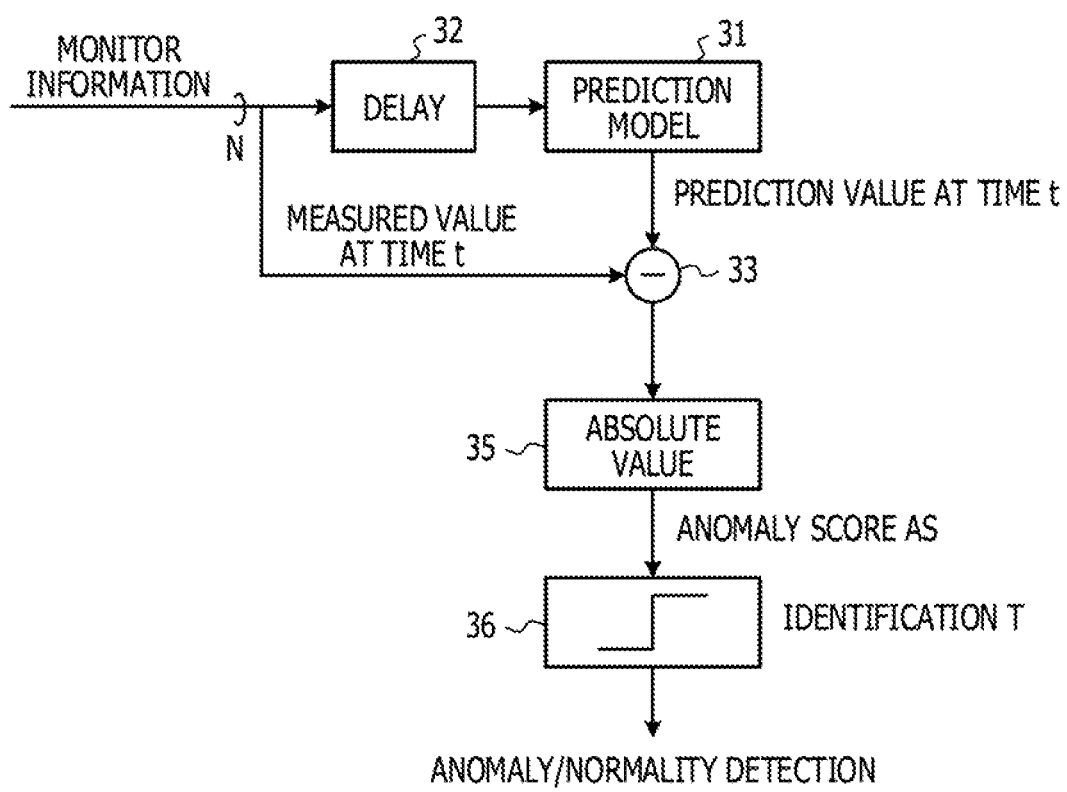
FIG. 7 illustrates an operation example of the anomaly detector during operation.

FIG. 7 illustrates the operation of the anomaly detector 30 during operation. The anomaly detector 30 includes the prediction model 31, the delay circuit 32, the subtractor 33, an absolute value converter 35, and an identifier 36. The determiner 34 illustrated in FIG. 5 may be used as the absolute value converter 35 and the identifier 36, but different reference values are set.

During operation, N pieces of monitor information monitored by the DSP 20 based on the digital sampling data at time t are input to the anomaly detector 30. The monitor information is coupled to the one input of the subtractor 33 as an measured value at time t.

Along with N pieces of monitor information, the digital sampling data is input to the anomaly detector 30 at time t. The digital sampling data is delayed by the delay circuit 32 by the signal processing time by the DSP 20 and input to the prediction model 31. The prediction model 31 calculates a prediction value from the input digital sampling data. This calculated value is coupled to the other input of the subtractor 33 as a prediction value at time t.

The output of the subtractor 33 is converted into an absolute value by the converter 35 and output as an anomaly score AS. The identifier 36 compares the anomaly score AS with the preset threshold T, identifies whether the score is abnormal or normal, and outputs an identification result.

Figure 8:
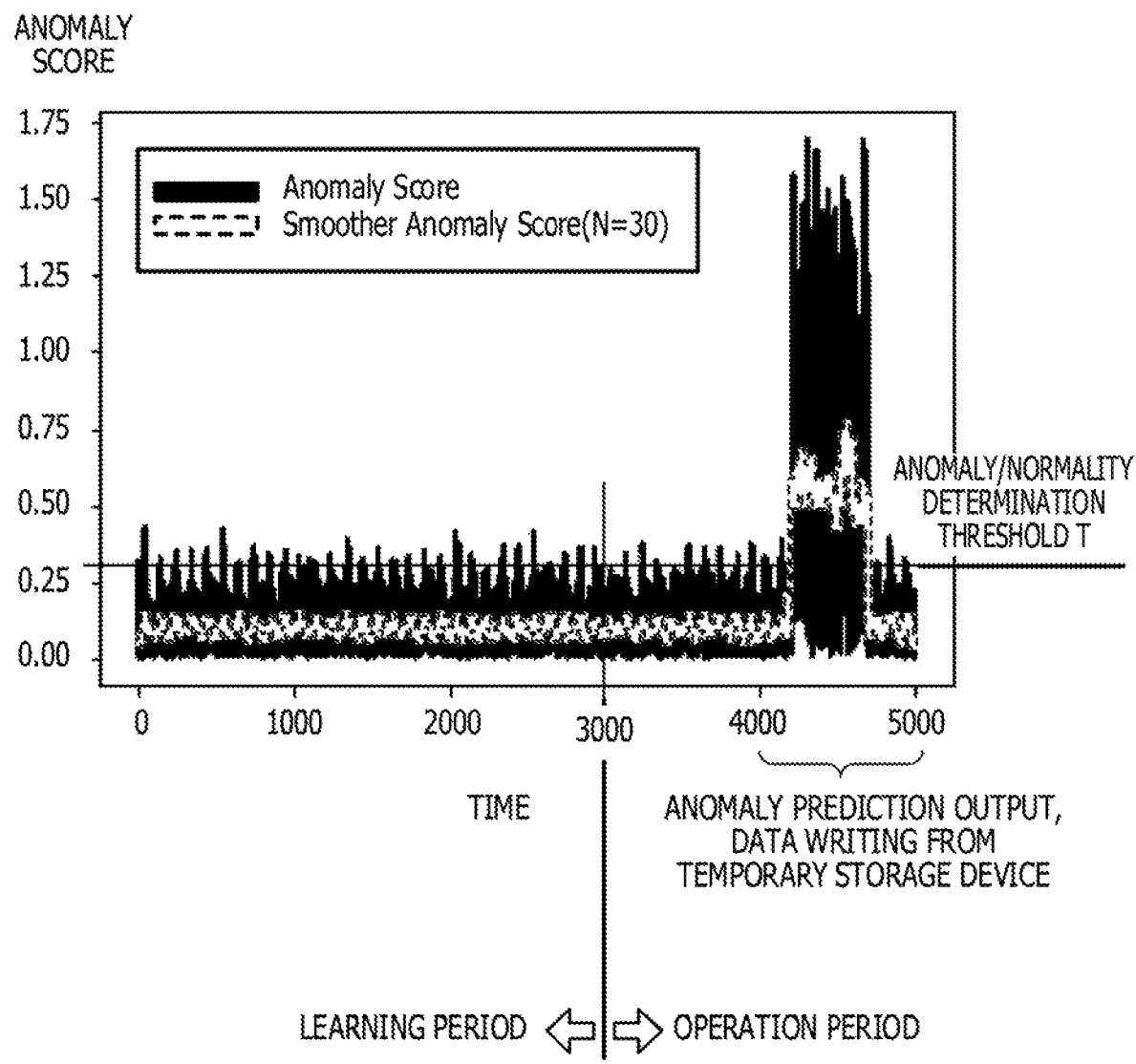
FIG. 8 illustrates an output example of an anomaly score.

FIG. 8 illustrates a detection example when an LSTM recurrent neural network is used as the prediction model 31, and is a record of an anomaly score acquired through a learning period and an operation period. Although the term "anomaly score" is not used in the learning mode, the absolute value of the difference between the measured value as the monitor output and the prediction value obtained from the learning prediction model 31 corresponds to the anomaly score in the monitoring mode.

The horizontal axis is time, the time index of 0 to 3000 refers to the learning period, and the time index exceeding 3000 refers to the operation period. The black line represents an anomaly score output at each time, and the gray data represents an anomaly score smoothed every 30 times. By smoothing, the fluctuation is absorbed and the score has an average value. The threshold T is set based on the raw data and smoothed data obtained in the learning mode. In the monitoring mode, the smoothed anomaly score may be compared with the threshold T, and a case where the smoothed anomaly score exceeds the threshold T may be detected as an anomaly occurrence.

In FIG. 8, during the time indexes of 4200 to 4700, the smooth value of the anomaly score AS exceeds the threshold T, and the anomaly prediction is output from the anomaly detector 30 to the external monitoring device 50. At the same time, digital sampling data is written from the temporary storage device 130 and stored in the external storage 40.

This method makes it possible to extract and store only data when an anomaly or its sign is detected. Resources may be saved, and the output of the anomaly prediction may be easily associated with the waveform data at the time, so that the transmission path anomaly may be efficiently analyzed.

<Transmission Path Fluctuation Simulation>

Figure 9:
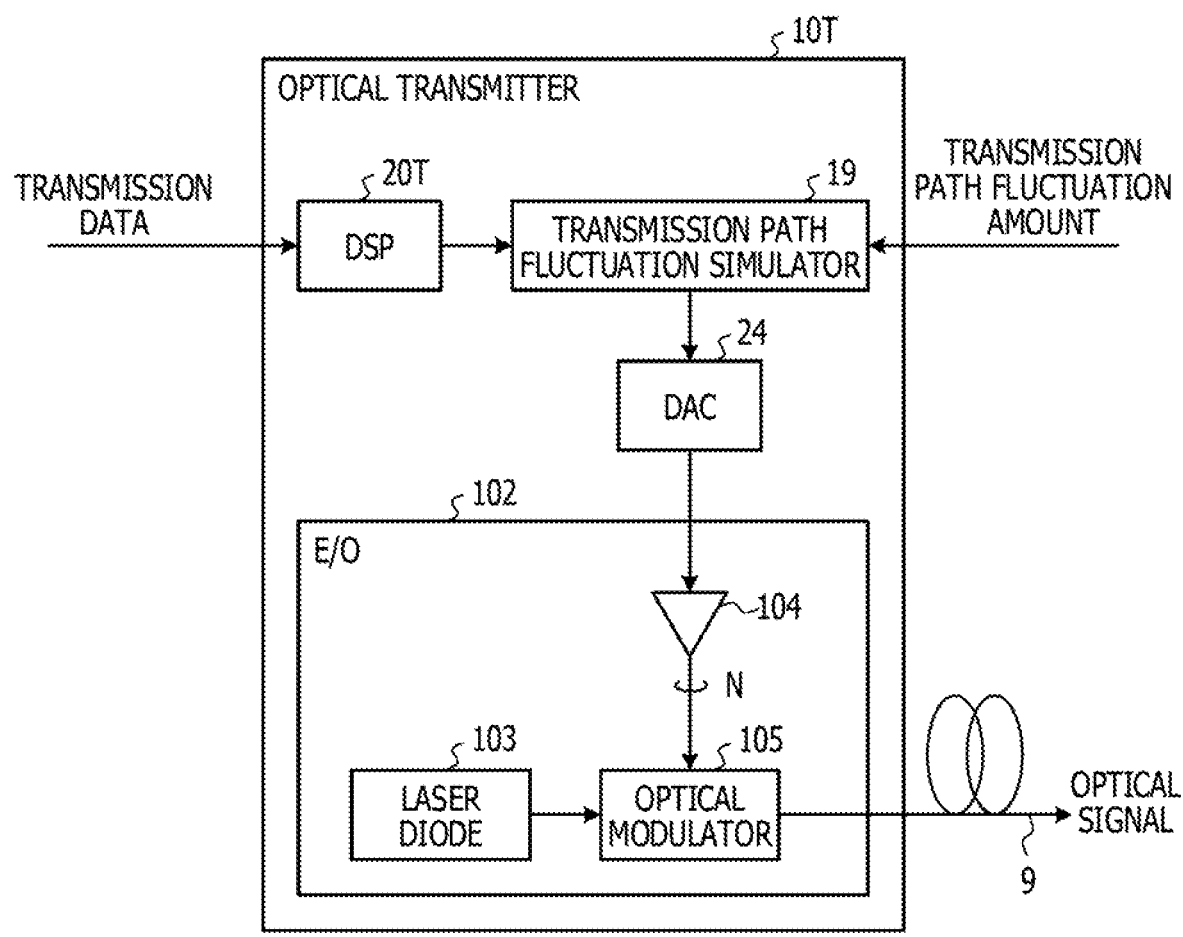
FIG. 9 illustrates a configuration example for simulating transmission path fluctuation within an allowable range in the learning mode.

FIG. 9 illustrates an example of a transmission path fluctuation simulation performed in the learning mode. In a case where learning the normal state of the transmission path in the learning mode, when learning only the transmission path in the normal real environment, a false positive alert may be generated at the time when the transmission path changes from the initial state although there is no operational problem to be an excessive alert. In order to avoid this, the fluctuations in both the normal real environment and the expected range where there is no operational problem are learned.

In the example of FIG. 9, a transmission path fluctuation simulator 19 is provided in the opposing optical transmitter 10T. The optical transmitter 10T includes a transmission side DSP 20T, the transmission path fluctuation simulator 19, a digital analog converter (DAC) 24, and the E/O converter 102. The E/O converter 102 includes a laser diode 103, an electric amplifier 104, and an optical modulator 105.

The transmission path fluctuation simulator 19 may be part of the transmission side DSP 20T, or may be a separate logic device such as an FPGA. The transmission path fluctuation simulator 19 is turned on in the learning mode and turned off in the monitoring mode in operation.

At the time of learning, the DSP 20T performs processing such as error correction coding and waveform shaping on the test signal to generate digital transmission data. The test signal is, for example, a pseudo random sequence. The transmission path fluctuation simulator 19 receives an expected transmission path fluctuation amount $\xi$. The fluctuation amount $\xi$ may be the same as the transmission path fluctuation amount $\xi$ set in step S14 of FIG. 3.

The digital transmission data to which the transmission path fluctuation amount $\xi$ is added by a transmission path simulator 19 is converted into an analog electrical signal by the DAC 14, a high-speed drive signal is generated by the electric amplifier 104, and is input to the optical modulator. A half-end rotation, a DGD, a PDL, a frequency drift, an OSNR degradation, a phase noise, and the like is added as the transmission path fluctuation amount, the fluctuation amount monitored by the optical transmitter 10R such as, for example.

The optical modulator 105 modulates the light incident from the laser diode 103 with a high-speed drive signal carrying the transmission path fluctuation amount $\xi$, and outputs the modulated light to the optical transmission path 9. The opposing optical receiver 10R receives the test signal to which transmission path fluctuation is added in learning mode, and learns the normal state of the transmission path. Therefore, an excessive alarm may be suppressed.

Figure 10:
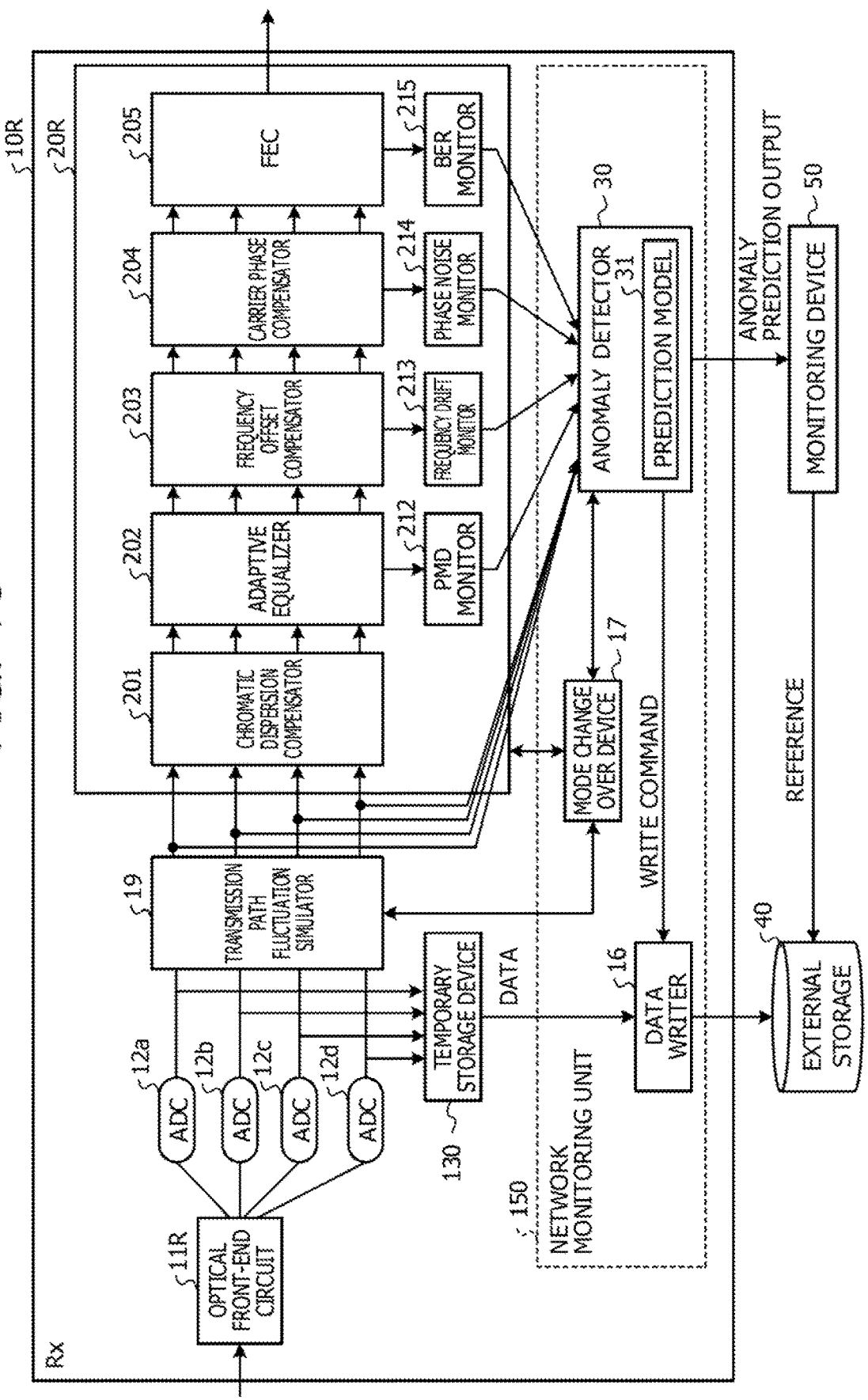
FIG. 10 illustrates a configuration example for simulating transmission path fluctuation within an allowable range in the learning mode.

FIG. 10 illustrates an example in which a transmission path fluctuation simulator 19 is provided in the optical receiver 10R. The transmission path fluctuation simulator 19 is turned on when the optical receiver 10R is in the learning mode, and is turned off when the optical receiver 10R is switched to the monitoring mode.

The transmission path fluctuation amount $\xi$ is added by the transmission path fluctuation simulator 19 to the waveform data digitally sampled by the ADCs 12a to 12d in the learning mode. This transmission path fluctuation amount $\xi$ may be the same as the transmission path fluctuation amount $\xi$ set in step S14 of FIG. 3. The digital sampling data to which the transmission path fluctuation amount $\xi$ is added is input to the DSP 20R and the anomaly detector 30 of the network monitoring unit 150. Each of the monitors 212 to 215 of the DSP 20R outputs the monitor value of the input digital signal to which the transmission path fluctuation amount ξ is added to the anomaly detector 30.

The anomaly detector 30 calculates a prediction value from the digital waveform data using the learning prediction model 31. The parameters of the prediction model 31 are updated based on the prediction values and the measured values from the monitors 212 to 215, and the optimal parameters are set in consideration of transmission path fluctuations in a range where there is no operational problem. When the learning is completed, the transmission path fluctuation simulator 19 is turned off.

Figure 11:
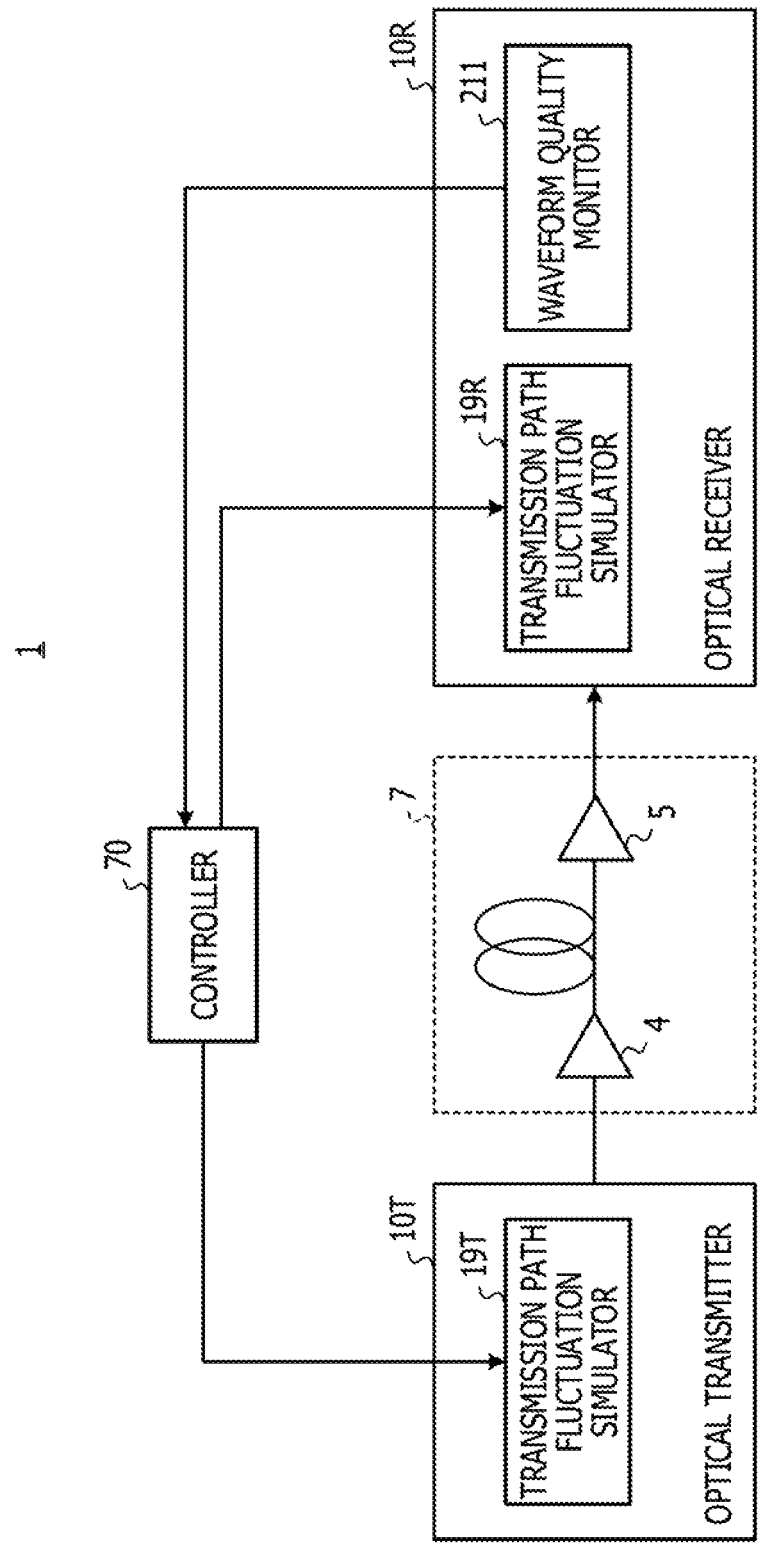
FIG. 11 illustrates a control example of the transmission path fluctuation amount according to the waveform quality monitor.

FIG. 11 illustrates a control example of the transmission path fluctuation amount based on the waveform quality monitor. In the example of FIG. 11, transmission path fluctuation simulators 19T and 19R are provided in the optical transmitter 10T and the optical receiver 10R, respectively.

The optical transmitter 10T and the optical receiver 10R are coupled to a controller 70 of the network. The controller 70 outputs a learning mode start command to the optical transmitter 10T and the optical receiver 10R when the optical transmitter 10T or the optical receiver 10R is coupled to the network or reactivated after maintenance. An initial value of the transmission path fluctuation amount ξ may be set in advance in at least one of the transmission path fluctuation simulator 19T and the transmission path fluctuation simulator 19R, or an initial value may be given from the controller 70.

The optical receiver 10R monitors the quality of the received waveform and notifies the controller 70 of the monitoring result. The controller 70 adjusts the transmission path fluctuation amount ξ based on the waveform quality monitor value. When the state with a good value as the waveform quality monitor value continues for a predetermined period or longer, the transmission path fluctuation amount ξ is increased to extend the expected fluctuation range. When the state where the waveform quality monitor value is bad continues for a predetermined period or longer, the transmission path fluctuation amount ξ is decreased to maintain the normal state of the optical transmission path 7 in an appropriate range.

When the predetermined learning period ends, the controller 70 outputs control signals for learning end and operation start to the optical transmitter 10T and the optical receiver 10R.

In FIG. 11, for convenience of explanation, the optical transmitter 10T and the optical receiver 10R are coupled by the optical transmission path 7. Generally, they have both a transmission function and a reception function, so that the controller 70 may perform control bidirectionally. When the communication device is an optical transceiver module as illustrated in FIG. 1B, the transmission path fluctuation simulator 19 may be used in the reception unit and the transmission unit.

By providing the controller 70, the learning mode automatically runs when the optical transmitter 10T or optical receiver 10R is newly coupled to the network, or when it is reactivated after maintenance, and the normal state of the transmission path including the transmission path fluctuation within the allowable range is learned. When learning is completed, the mode is automatically switched to the monitoring mode. In anomaly detection during operation, a change in the state of the transmission path that occurs on the time axis is continuously monitored by the communication device, and data related to the anomaly or its sign is efficiently extracted and stored. This allows for a detailed analysis after the event while saving resources. In addition, an excessive alert is suppressed, and anomaly detection accuracy of the transmission path is improved.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A communication device used in an optical communication system, the communication device comprising:
    a storage device that stores digital waveform data for a certain time; and
    processor circuitry coupled to the storage device, the processor circuitry being configured to:
    execute a mode change over processing configured to switch between a learning mode for learning a normal state of an optical transmission path before operation and a monitoring mode for monitoring a state of the optical transmission path during operation;
    obtain a prediction model of the optical transmission path, the prediction model being a model established in the learning mode by using a machine learning algorithm and the digital wave form data obtained from the storage device;
    calculate, in the monitoring mode, an anomaly score of the optical transmission path by using the obtained prediction model;
    execute, in the monitoring mode, an anomaly detection processing configured to detect, by using the anomaly score, an anomaly of the optical transmission path;
    execute a data writing processing configured to extract, in response that the anomaly is detected, the digital waveform data including information related to the anomaly to output the extracted waveform data to an outside; and
    execute, in the learning mode, a simulation processing configured to simulate a physical change that occurs in the optical transmission path, wherein
    the simulation processing is configured to add a given fluctuation amount to a test signal received from the optical transmission path, and
    the prediction model is determined based on the waveform data to which the given fluctuation amount is added.

2. The communication device according to claim 1, wherein the storage device includes a temporary storage device that stores the digital waveform data,
    the data writing processing is configured to receive a write command from the anomaly detection processing in response that the anomaly is detected, write the digital waveform data in response that the anomaly is detected from the temporary storage device, and store the written digital waveform data in an external storage.

3. The communication device according to claim 2, wherein when the anomaly is not detected, the digital waveform data recorded in the temporary storage device is overwritten with next waveform data.

4. The communication device according to claim 1, wherein the processor circuitry includes a simulation circuit configured to perform the simulation processing, and
the prediction model is established in the learning mode by learning a normal state of the optical transmission path including a simulated state of the physical change obtained by the simulation circuit.

5. The communication device according to claim 4, wherein
the simulation circuit is configured to add, as the given fluctuation amount, a predetermined fluctuation amount to the test signal received from the optical transmission path, and
the waveform data to which the predetermined fluctuation amount is added is input to the anomaly detection processing.

6. The communication device according to claim 4, wherein the simulation circuit is configured to add, as the given fluctuation amount, a predetermined fluctuation amount to the test signal output to the optical transmission path.

7. The communication device according to claim 5, further comprising:
a waveform quality monitor circuit configured to monitor a quality of a received waveform, wherein
a monitoring result by the waveform quality monitor circuit is supplied to an external controller, wherein
the simulation circuit is configured to receive, from the external controller, a control signal for adjusting the predetermined fluctuation amount.

8. The communication device according to claim 1, further comprising:
a photoelectric converter circuit configured to convert an optical signal received from the optical transmission path into an electrical signal;
an analog/digital converter circuit configured to digitally sample the electrical signal; and
one or more monitor circuitry configured to monitor a state of the optical transmission path, wherein
digital sampling data output from the analog/digital converter circuit is input to the one or more monitor circuitry and the anomaly detection processing, and wherein
the prediction model is established in the learning mode based on a measured value obtained by the one or more monitor circuitry and a first prediction value calculated from the digital sampling data using an initial prediction model.

9. The communication device according to claim 8, wherein in the monitoring mode, the anomaly detection processing detects the anomaly based on the measured value obtained by the one or more monitor circuitry and a second prediction value calculated from the digital sampling data using the established prediction model.

10. The communication device according to claim 8, wherein
the anomaly detection processing includes:
delaying the digital sampling data during a period in which the measured value is obtained by the one or more monitor circuitry;
obtaining a difference between the first prediction value after the delay and the measured value obtained by the one or more monitor circuitry; and
updating the initial prediction model in response that an absolute value of the difference exceeds a prediction error reference value in the learning mode.

11. The communication device according to claim 9, wherein
the anomaly detection processing includes:
delaying the digital sampling data during a period in which the measured value is obtained by the one or more monitor circuitry;
obtaining a difference between the second prediction value after the delay and the measured value obtained by the one or more monitor circuitry; and
identifying the anomaly in the optical transmission path in response that an absolute value of the difference exceeds a predetermined threshold in the monitoring mode.

12. A communication method in an optical communication system, the method comprising:
by a communication device;
executing a mode change over processing configured to switch between a learning mode for learning a normal state of an optical transmission path before operation and a monitoring mode for monitoring a state of the optical transmission path during operation;
obtaining a prediction model of the optical transmission path, the prediction model being a model established in the learning mode by using a machine learning algorithm and a digital wave form data obtained from a storage device;
calculating, in the monitoring mode, an anomaly score of the optical transmission path by using the obtained prediction model;
executing, in the monitoring mode, an anomaly detection processing configured to detect, by using the anomaly score, an anomaly of the optical transmission path;
executing a data writing processing configured to extract, in response that the anomaly is detected, the digital waveform data including information related to the anomaly to output the extracted waveform data to an outside; and
execute, in the learning mode, a simulation processing configured to simulate a physical change that occurs in the optical transmission path, wherein
the simulation processing is configured to add a given fluctuation amount to a test signal received from the optical transmission path, and
the prediction model is determined based on the waveform data to which the given fluctuation amount is added.

13. The communication method according to claim 12, wherein
the storage device includes a temporary storage device that stores the digital waveform data,
the data writing processing is configured to
receive a write command from the anomaly detection processing in response that the anomaly is detected,
write the digital waveform data in response that the anomaly is detected from the temporary storage device, and
store the written digital waveform data in an external storage.

14. The communication method according to claim 13, wherein when the anomaly is not detected, the digital waveform data recorded in the temporary storage device is overwritten with next waveform data.

15. The communication method according to claim 12, wherein
the simulation processing is performed by a simulation circuit, and
the prediction model is established in the learning mode by learning a normal state of the optical transmission path including a simulated state of the physical change obtained by the simulation circuit.

16. The communication method according to claim 15, wherein the simulation processing is configured to add, as the given fluctuation amount, a predetermined fluctuation amount is to the test signal received by the communication device from the optical transmission path, and the prediction model is determined based on the waveform data to which the predetermined fluctuation amount is added.

17. The communication method according to claim 15, wherein the simulation processing is configured to add, when the physical change is simulated, a predetermined fluctuation amount as the given fluctuation amount to the test signal output from the communication device to the optical transmission path.

18. The communication method according to claim 16, wherein the communication device monitors a quality of a received waveform, outputs a monitoring result of the received waveform quality to an external controller, and receives, from the external controller, a control signal for adjusting the predetermined fluctuation amount.

19. The communication method according to claim 12, wherein when performing the learning, the communication device converts an optical signal received from the optical transmission path into an electrical signal, digitally samples the electrical signal to output digital sampling data, and determines the prediction model based on a measured value obtained by monitoring the digital sampling data and a first prediction value calculated from the digital sampling data using an initial prediction model.

20. The communication method according to claim 19, wherein the anomaly is detected during operation based on the measured value and a second prediction value calculated from the digital sampling data using the determined prediction model.

* * * * *